(12) United States Patent
Wodeslavsky

(10) Patent No.: US 6,263,784 B1
(45) Date of Patent: Jul. 24, 2001

(54) INDOOR/OUTDOOR SMOKELESS GRILL WITH CONTROLLED MOIST HEAT

(76) Inventor: Josef Wodeslavsky, #5 Peter Lynas Ct., Tenafly, NJ (US) 07670

( * ) Notice: Subject to any disclaimer, the term of this patent is extended or adjusted under 35 U.S.C. 154(b) by 0 days.

(21) Appl. No.: 09/619,624

(22) Filed: Jul. 19, 2000

(51) Int. Cl.[7] .............................. A47J 37/04; A47J 37/06
(52) U.S. Cl. ................... 99/340; 99/446; 99/450; 99/482; 126/9 R; 126/25 R; 126/41 R
(58) Field of Search ................ 99/339, 340, 352–355, 99/444–450, 481, 482, 483, 417, 467; 126/25 R, 25 A, 9 R, 9 B, 41 R, 25 B

(56) References Cited

U.S. PATENT DOCUMENTS

| | | | |
|---|---|---|---|
| 3,299,800 | * | 1/1967 | Angelo ................................ 99/417 |
| 4,094,295 | * | 6/1978 | Boswell et al. .................... 126/25 R |
| 4,495,860 | * | 1/1985 | Hitch et al. .............................. 99/340 |
| 4,962,696 | * | 10/1990 | Gillis .................................. 99/448 X |
| 4,962,697 | * | 10/1990 | Farrar ................................. 99/482 X |

* cited by examiner

Primary Examiner—Timothy F. Simone

(57) ABSTRACT

An indoor/outdoor smokeless grill for grilling and barbecuing food, this grill emits a variable controlled amount of steam during the grilling process: more steam during the early part of the process when the food is raw, and a reduction in the amount of steam emitted as the cooking process continues. This is accomplished by way of insulating the water containers from direct, intense heat and a grill situated on top of the heat source, and with a lid or cover on the grill to capture the steam and cook the food through a combination of steam and heat in a convection process.

7 Claims, 3 Drawing Sheets

INDOOR/OUTDOOR SMOKELESS GRILL WITH CONTROLLED MOIST HEAT

SUMMARY OF THE INVENTION

This invention is an improvement of my previous invention U.S. Pat. No. 5,862,741. The previous invention is an indoor nonsmoking grill used for barbecuing food. Said previous invention functions based on a grill situated over a water tank that absorbs that fat and particles which melt from the food, and said fat and food particles can also fall onto an upper dish that is constructed a runnel which also contains water. Since both water containers are exposed to intense heat, the water is boiling and emits steam which also helps cook the food. This invention will improve the previous one by prolonging the length of time that said water in the utensil will boil and emit steam, thus prolonging the cooking process.

The other aim of this invention is to use this grill to cook food faster by bring the food nearer to the fire source and still retain the steam-emitting process without having the water completely evaporated before the cooking process has ended.

The design of the upper dish containing the runnel which contains water is crucial to the purpose of this invention, as the point is to insulate this water supply from the intense heat source so that the water, while boiling, evaporates into steam in as slow a manner a possible. The dish containing the runnel is designed so that cool air is continuously pulled against the dish's outer surface during the cooking process, thus cooling the dish and keeping the temperature of the dish, and the water it contains, lower.

The method of keeping the water in the container for a longer period of time during the cooking process is by insulating the container that holds the water from receiving heat directly from the heat source.

Another aim of this invention is to better spread the heat on the grill so that it is even, since the grill is exposed to the heat source only at its center.

DETAILED DESCRIPTION OF THE EMBODIMENT

Figure 1:
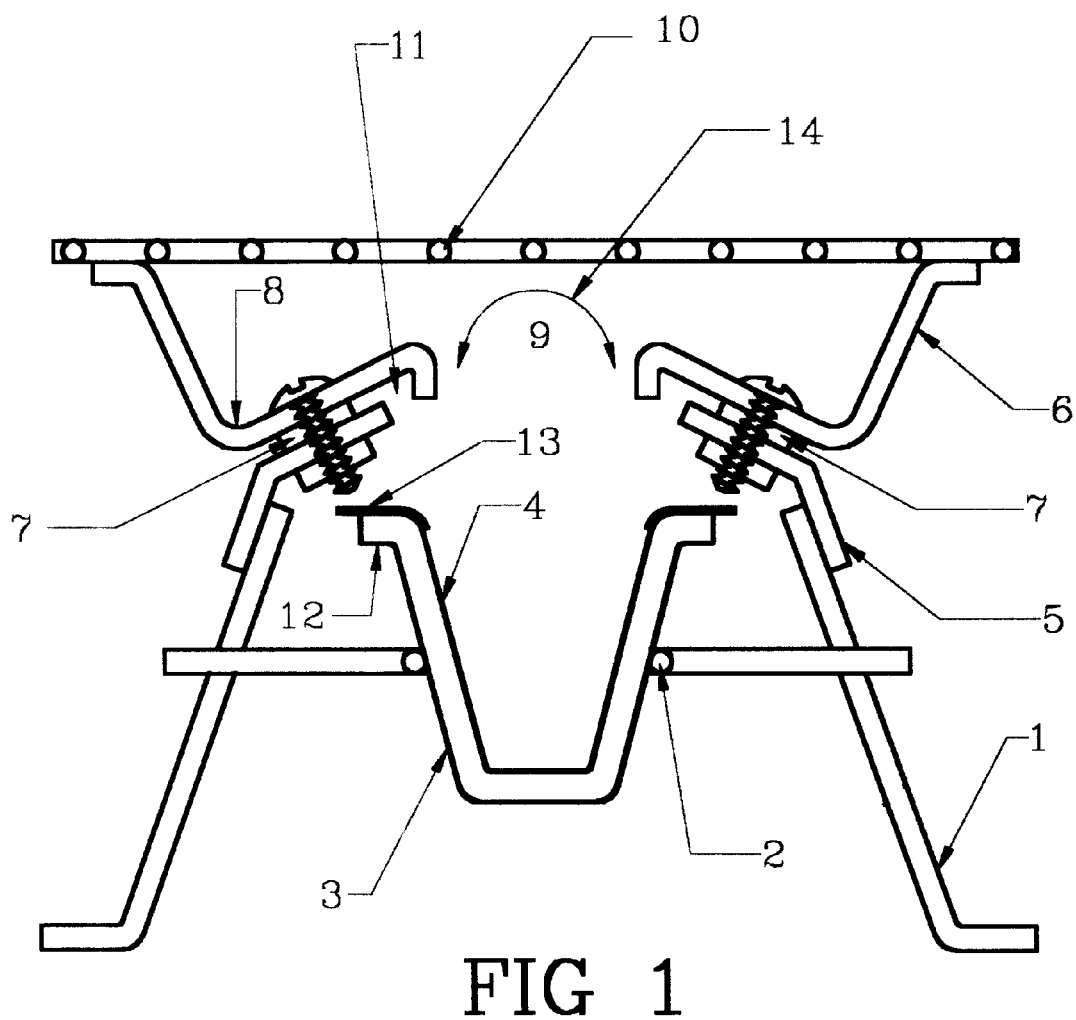
FIG. 1 will illustrate the indoor smokeless grill containing two insulated water containers that give off steam early in the cooking process and absorb the melting fat throughout the cooking process.

FIG. 1 will illustrate a sleeve 1. Into sleeve 1 is mounted a ring 2, and into ring 2 slides a container 3. Into container 3 slides container 4. Between said containers is a space filled with air from the atmosphere that insulates container 4, which is filled with water, from container 3, which is exposed to fire or a heat source, as well as from the direct heat source. This complete assembly is situated on a heat source such as the burner of a gas stovetop. On top of sleeve 1 is mounted a second sleeve 5. Sleeve 5 is connected to dish 6. There are several washers 7 that keep dish 6 from touching sleeve 5, making a space that will be exposed to air for insulation purposes. Thus if sleeve 5 is hot, only a small amount of heat will be transmitted to dish 6. The runnel 8 in dish 6 is filled with water for two purposes: (a) to absorb the melting fat from the food being grilled and (b) to emit steam toward the food. Hole 9 transmits the heat from the burner to grill 10. The moment the fire starts the heat will rise, and said heat will collide with sleeve 5, directing it to hole 9. The rising stream of hot air in hole 9 will suck cool air from the atmosphere in the space 11 between sleeve 5 and dish 6, thus reducing the temperature of the water in runnel 8. Therefore said water in runnel 8 will warm up more slowly and will evaporate more slowly. The same process of water evaporating in said runnel will occur in containers 3 and 4, since container 4 is not in direct contact with the heat source and the only contact between said containers is by flanges 12 and 13. In the initial barbecue process container 4 will be full of water up to flange 13. When the burner is ignited, the resulting heat will collide with flange 12, which will transmit said heat to flange 13. The hot metal of flange 13 will transmit the heat to the water in container 4. After a period of time said water will begin to boil and will start to emit steam. As this process continues the water level in container 4 will go down. As the water level in container 4 goes down, more heat will be required to maintain the same rate of evaporation, since the water in container 4 will be less exposed to flange 13, which is the heat source for said water and which is located on the top of container 4. Therefore in the beginning of the cooking process we get more steam, which is needed at that point since the food is raw, and the longer the cooking process takes place we need less steam and more dry heat. This is exactly what occurs because of the design of containers 3 and 4 and of the insulated runnel. The cooking process reaches a point when the water in runnel 8 stops evaporating into steam. This is good for two reasons: (a) at a certain point we do not want steam and (b) we still need water in container 4 so that it can absorb the melting fat from the food without creating smoke, since the cooking utensil we are describing is a smokeless grill. After the water from runnel 8 ceases to evaporate into steam, the cooking process is completed by dry heat alone.

The same thing has happened on top of dish 6. At the beginning of the cooking process the water in runnel 8 reaches the lips 14 of dish 6 in hole 9. While cooking takes place the water level will come down and the heat from lips 14 will have to travel a longer distance to reach the water, so that more heat will be needed to maintain the same rate of evaporation. Therefore the longer the cooking process lasts the less evaporation into steam occurs, until evaporation ceases altogether. This is exactly what is needed. Air from the atmosphere is only one possible sources of insulation.

Figure 2:
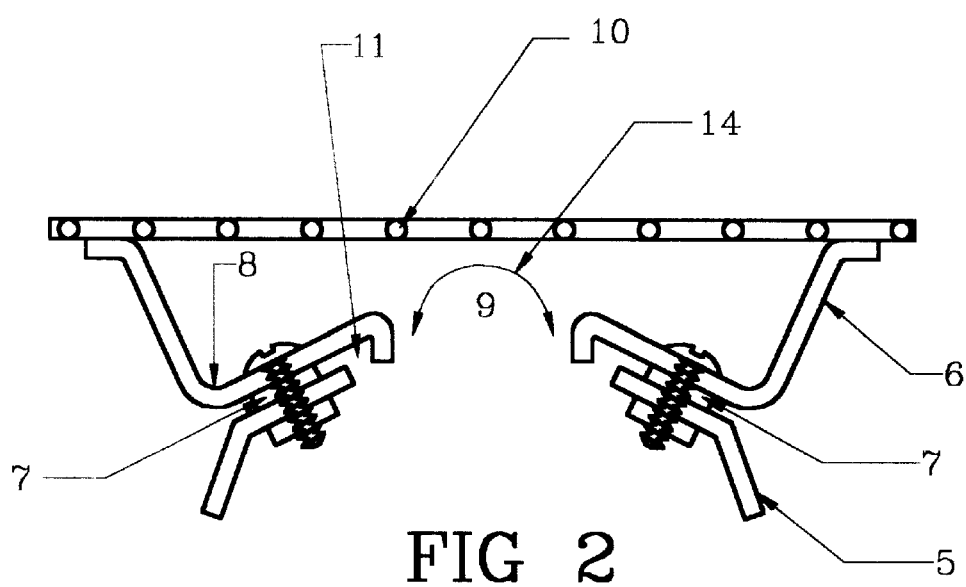
FIG. 2 will illustrate the indoor smokeless grill containing one insulated water container that gives off steam early in the cooking process and absorbs the melting fat throughout the cooking process.

FIG. 2 will illustrate the upper embodiment of FIG. 1 whereby sleeve 5 is situation on top of the burner or heat source without the assembly of containers 3 and 4. Thus the heat will pass directly through hole 9 to heat grill 10. This assembly will grill the food faster since it will be situated nearer to the heat source. In this case the food should be situated on the grill but not in its center in order to eliminate the possibility of fat dropping on the fire and thus creating smoke.

Figure 3:
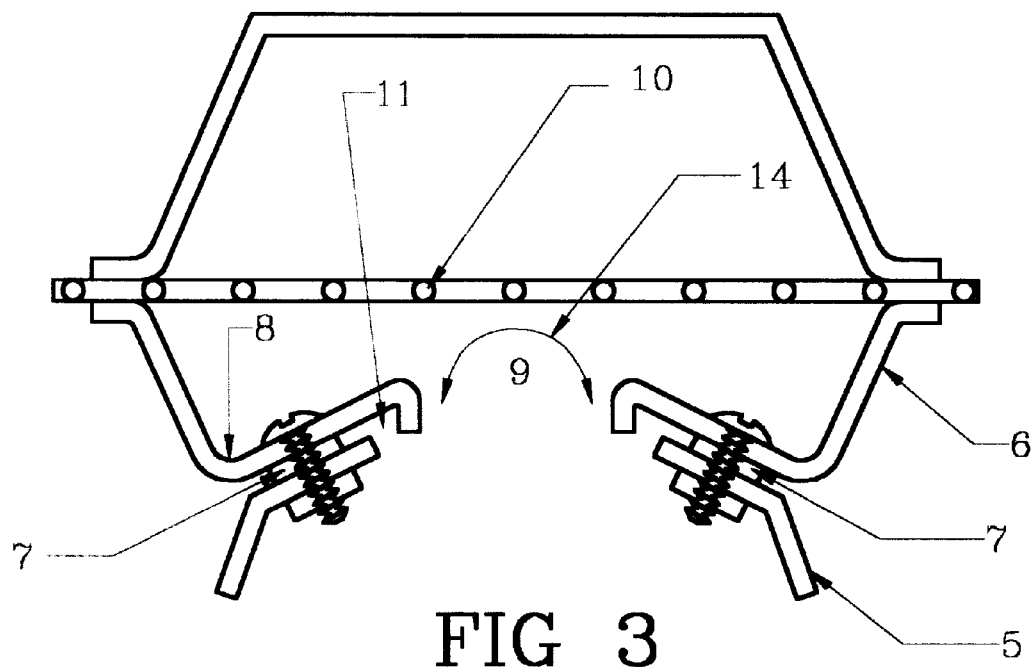
FIG. 3 will illustrate a heat convection smokeless grill.

FIG. 3 will illustrate the same embodiment as FIG. 2, with the addition of a lid or cover situated on the grill. Said cover will capture the steam and the heat to cook, the food through a convection process with moist burning heat.

It should be noted that these methods of heat transmission are examples only and the methods that can be used are not limited to those examples.

It should be noted that all of the methods of grilling or barbecuing food can be used on these mentioned figures, for example a rotisserie assembly, can be used to rotate the food in conjunction with the described grill.

I claim:

1. An indoor/outdoor smokeless grill that consists of a first hollow sleeve with both ends open, a second hollow sleeve with both ends open, a hollow dish, a grill means whereby said second hollow sleeve is disposed on top of said first hollow sleeve and said hollow dish is disposed on said second hollow sleeve, and into said first hollow sleeve is situated two containers of different diameters which are both open-ended on one side, with the first container sliding into the second container in such a way that the second contact between the two container leaves an empty space, said empty space to be filled with a heat-insulating material in order to protect the surface of the inner container from the direct heat source, thus water contained in the inner container will be subject to less heat versus the outer container.

2. An indoor/outdoor smokeless grill as in claim 1 whereby said hollow dish is in direct contact with said second sleeve in a way that insulating material insulates said hollow dish from said second sleeve whereby only part of the heat from said second sleeve will be transmitted to said hollow dish.

3. An indoor/outdoor smokeless grill as in claim 1 or 2 whereby the insulating material is air.

4. An indoor/outdoor smokeless grill as in claims 1 or 2 whereby the insulating material is air.

5. An indoor/outdoor smokeless grill as in claim 1 whereby the grilling means, which is situated on said hollow dish is a known grilling means.

6. An indoor-outdoor smokeless grill that consists of:
a sleeve open at both ends being situated on a heat source, a distance means, a curved holed dish and a grill means, whereby said distance means being disposed between said sleeve and said dish in order to keep said dish distanced from said sleeve in order to ventilate said dish by fresh, cooled air which will be sucked into the hole of said dish, and said curved dish is shaped to hold a liquid which evaporates gradually in the cooking process and at the same time captures the fat which has melted from the cooked food, and said grill means is situated on said dish.

7. An indoor-outdoor smokeless grill as in claim 6, which is further comprised of a lid, and said lid is disposed on said grill in order to capture the moist heat.

* * * * *